INVENTORS
FRITZ K. PREIKSCHAT
HOWARD W. WEST
BY
ATTORNEY

United States Patent Office 3,430,140
Patented Feb. 25, 1969

3,430,140
MOISTURE DETECTION WITH SEQUENTIALLY SWITCHED BALANCED ELECTRODE PAIRS
Fritz K. Preikschat, Bellevue, and Howard W. West, Kirkland, Wash., assignors to Laucks Laboratories, Inc., Overlake Park, Wash., a corporation of Washington
Filed Mar. 2, 1966, Ser. No. 531,207
U.S. Cl. 324—61
Int. Cl. G01r 27/24, 27/26
8 Claims

ABSTRACT OF THE DISCLOSURE

Temperature insensitive moisture detection in a succession of zones across a workpiece is detected by sequentially sampling in-line balanced pairs of normally balanced active and dummy electrode strips mounted in superposed registry on respectively opposite faces of an insulative support panel of a thermal conductivity which is materially higher than applied sheets of thermal insulation material sandwiching the electrode-panel assembly between them so as to create essentially a similar thermal environment for the electrodes of each pair. Sequential sampling is performed by a counter type circuit which forward-biases pairs of gating diodes associated with the electrode pairs in successive order.

---

This invention relates to improvements in apparatus primarily intended for measuring moisture content in dielectric materials. While the invention is herein illustratively described by reference to the presently preferred embodiments thereof as applied to moisture detection in sheet materials, it will be recognized that certain modifications and changes therein with respect to details may be made without departing from the essential features involved.

In the intended operating mode of the improved tester dielectric sheet material to be tested for moisture content (e.g. wood veneer, paper web, gypsum board, etc.) is moved through the field of electrodes connected in a bridge circuit energized by alternating voltage. Moisture variations in the material alter the electrical admittance value of the electrodes and thereby produce a corresponding unbalance in the bridge circuit, which may be measured or otherwise utilized so as to produce a response. However, the amount of changes in electrical admittance is very small (i.e. usually only a few hundredths of a picofarad), such that the apparatus must be extremely sensitive. Because of this a number of serious technical problems arise. For example, the mere change of physical dimensions of the electrode system caused by ambient (and sheet material) temperature fluctuations normal to most sheet material production lines can drastically affect the system calibration and, if not taken into account, can render the moisture measurements virtually useless. In most cases it is impractical to attempt solving the problem by regulating temperature at a constant value. Moreover, when the sheet material is being scanned rapidly and systematically in all areas as it moves past the electrode station the individual measurements must be substantially accurate as made, since there is no time for corrections, and the measurements made in the different zones or areas of the sheet must be consistent with each other, i.e. bear the same relationship to the calibrational reference of the common system. With an array of individual electrodes being switched individually into and out of the measurement system in rapid succession so as to scan the width of the moving sheet recurringly as it moves by, electrical uniformity in the individual electrode switching devices is essential as is symmetrical balance and similarity in the respectively associated bridge circuit connections.

A broad object of this invention, therefore, is to provide moisture detection apparatus meeting these difficulties in a practical and effective manner, such that consistently repeatable results are attainable by the system at reasonable cost, and such that a standardized production system will operate satisfactorily under various production line conditions likely to be encountered.

A further object hereof is to provide a highly sensitive yet stable and readily calibrated moisture detection system, with minimum tendency for drift of its electrical characteristics with passage of time or with changes of temperature. A related purpose is to provide a thermally self-compensated multiple-electrode array assembly adapted for incorporation in a sensitive electronic scanning type moisture detection system.

Compactness, protective self-containment, maintenance-free operation, simplicity and low cost of the housed electrode array assembly and associated electrical components constitute further objectives hereof.

As herein described, the apparatus comprises a plurality of mutually superimposed similar active and dummy electrode pairs arrayed in series arrangement extending transversely across the path of movement of the sheet material to be tested. The electrodes are insulatively mounted in one side of an elongated conductive housing facing the sheet material from a location proximate thereto so as to be influenced by the sheet material, which housing also encloses bridge circuit components individually associated with the electrode pairs. These components, in respectively opposite sides of a bridge circuit, are symmetrically mounted in relation to the housing walls and the circuit conductors by which they and their associated electrode pairs may be successively connected into the common measurement circuit. By employing very thin (i.e. "printed circuit") electrodes of small thermal capacity and by incorporating such electrodes in a novel thermal equalizing laminar assembly, external temperature changes tending to disturb the calibration of the active electrode side of the bridge are continuously neutralized by similar changes affecting the dummy electrode side thereof.

In accordance with further objectives, sequential connection of the active and dummy electrode pairs and associated bridge circuit balanced units into the common measurement circuit is performed by matched solid-state diodes bias-controlled by an electronic counter type circuit, although in one illustrated embodiment wherein the sheet material is marked in localized areas in which the measured value of moisture deviates excessively from the desired norm, a multi-rotor mechanical switch is shown as a means to coordinate the scanning and marking functions without use of other moving parts. In either case, scanning speed and scanning recurrence rate may be set to suit the requirements of the particular installation, as of course may the size, shape, physical spacing and number of electrode units employed in a given array.

Figure 1:
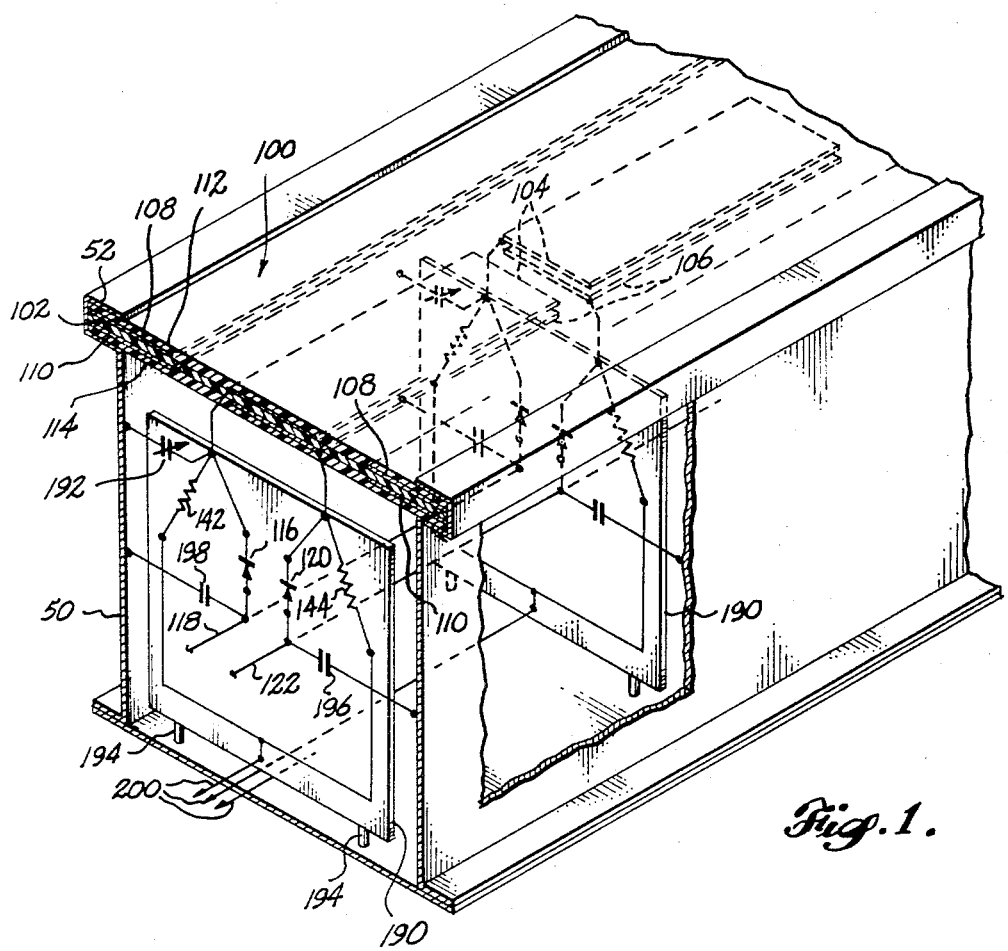
FIGURE 1 is an isometric view of the moisture detector electrode unit and related bridge components assembly of this invention, including the housing and mounting arrangements therein, the structure being shown in transverse section with a wall portion broken away.
Figure 2:
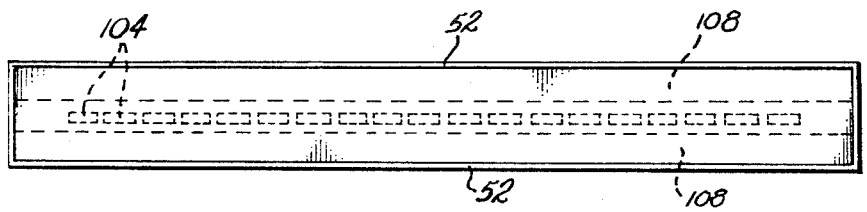
FIGURE 2 is a face view of the electrode assembly housing showing the arrangement of test electrodes therein.
Figure 3:
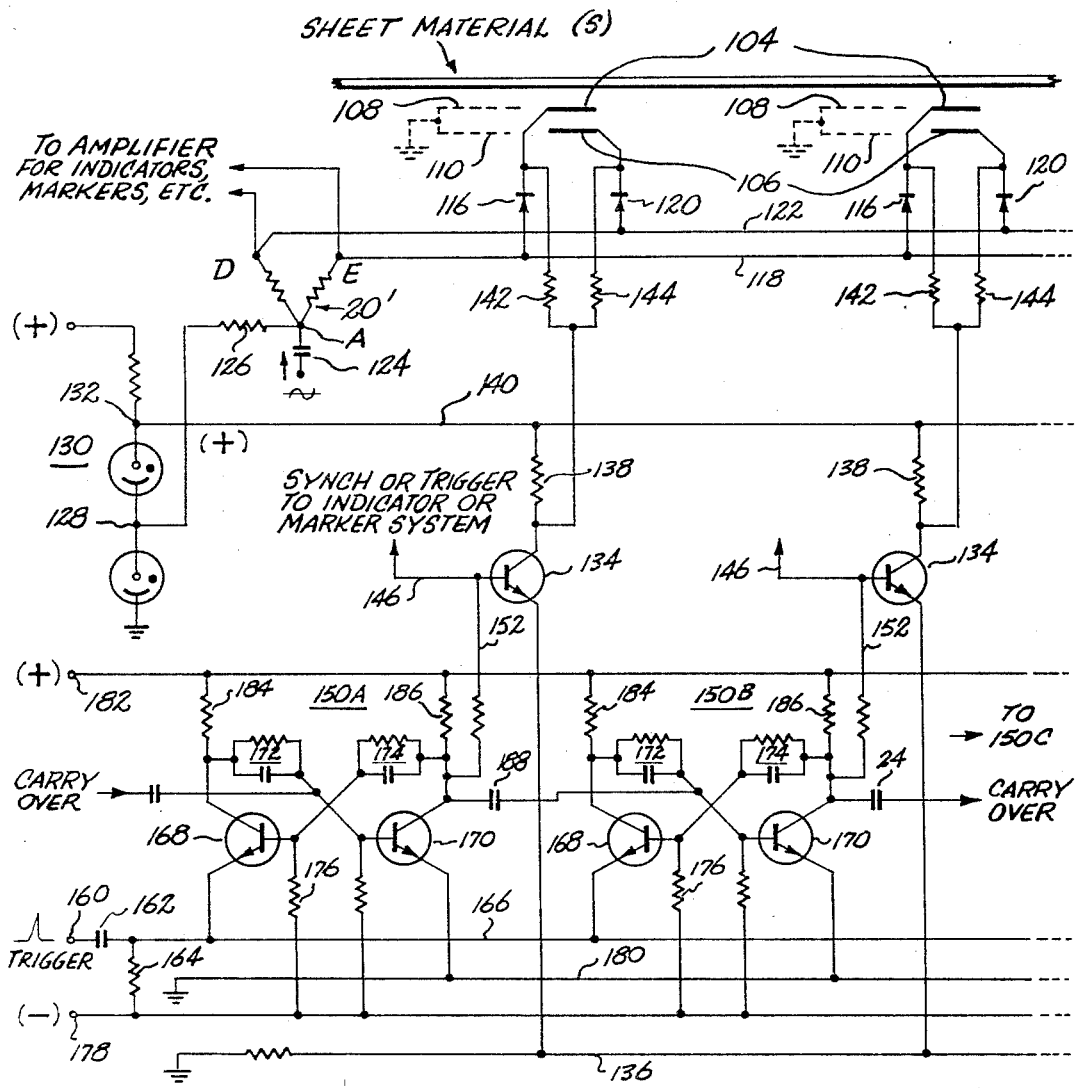
FIGURE 3 is a simplified schematic diagram of the modified moisture detector particularly showing a sequence switching circuit.

As illustrated the electrode assembly comprises an elongated box-like conductive housing 50 having inwardly open channels 52 extending lengthwise thereof along opposite sides at the top of the housing. These channels accommodate and retain the opposite edges of a laminar thermal equalizing electrode assembly 100 which forms the top closure of housing 50 which in use is positioned in proximate parallel relationship to the work material S (FIGURE 3). This laminar assembly preferably comprises at its core a printed circuit board 102. Board 102 may comprise a glass fiber reinforced epoxy resin sheet having sufficient stiffness to form a substantially flat space between the sides of housing 50. Similar active electrode strips 104 and dummy electrode strips 106 are deposited or bonded in mutually superimposed relationship on respectively opposite surfaces of the board 102. These electrodes are located in close succession in a series array extending substantially the length of the housing. When installed on a production line the housing extends transverse to the line of movement of the work material being tested for moisture content, as in the case of Ser. No. 456,330 filed June 21, 1965, by Fritz K. Preikschat, Segmented Electrode Moisture Detector for Sheet Material.

The opposed rows of active and dummy electrode strips are centered transversely in an electrical aperture. For the active electrodes this aperture is defined by and between electrically grounded printed circuit strips 108 deposited on and extending along opposite sides of board 102. For dummy electrodes 106 the aperture is defined by the grounded printed circuit strips 110 underlying and similar to strips 108. These pairs of strips 108 and 110 make ground contact with housing 50 and thus serve as electrodes for the array electrodes 104 and 106. Being formed on the respective surfaces of the printed circuit board, active electrodes 104 are in co-planar registry with and spaced edgewise from ground electrodes 108, while dummy electrodes 106 are in co-planar registry with and spaced edgewise from electrodes 110. Hence voltage applied between a given active electrode 104 and its opposing ground electrode means 108 produces a field which fringes upwardly from the face of the laminar assembly and into any sheet material S overlying the same, whereas corresponding voltage applied between the opposing dummy electrode 106 and the related ground electrode means 110 produces a similar fringing field which bulges downwardly into the interior of the enclosure. Secondary or ground electrode strips 108 and 110 project inwardly toward the respective primary active and dummy electrodes 104 and 106 from the side walls of the housing 50 a sufficient distance that the capacity to ground of each active electrode 104 will be substantially the same as the capacity to ground of each dummy electrode 106. That is, the conductive parts of the enclosure proper (i.e. the walls, retainer channels, etc.,) will have little effect and will not unbalance the electrode pairs even though the dummy electrodes face into the interior of the box while the active electrodes face outwardly therefrom.

By mounting a dielectric cover sheet 112 over the top face of the printed circuit board and a similar dielectric cover sheet 114 in corresponding relationship to the under side of the printed circuit board, the described temperature-equalizing laminar assembly is completed with the electrode elements thermally insulated from their respectively adjacent thermal environments. Preferably the cover sheets 112 and 114 are of a high-lag thermal insulation material such as tetrafluoroethylene, whereas the printed circuit board itself representing the electrical insulation medium between the active and dummy electrodes is of a relatively low-lag insulation material. Consequently both sides of the electrode assembly are thermally insulated in a substantial degree against the effects of temperature change either within the housing or within the exterior environment including the sheet material moving across the top side of the electrode-housing unit. However, to the extent that temperature changes do permeate the laminar assembly and tend to affect the electrodes, the active and dummy electrode means are affected substantially in like manner due to the low heat capacity of the very thin electrodes, their separation by a thin sheet of electrical insulation which is of relatively high thermal conductivity, and their envelopment between the more highly insulative thermal barrier sheets 112 and 114. Thus, by connecting corresponding active and dummy electrodes simultaneously in opposite sides of a detector bridge circuit, the effects of temperature change on the dimensional relationship of the electrodes, and which would otherwise tend to unbalance the bridge due to the resultant change of admittance thereof, are self-compensated. By providing a moisture-tight seal at the interfaces of the laminar assembly and the retainer channels 52 extending marginally around the entire periphery of the laminar assembly, the interior of the enclosure may be sealed effectively against entry of moisture if desired.

In FIGURE 3 each active electrode 104 is connected through a switch diode 116 to a common conductor 118 leading to an intermediate corner E of bridge circuit 20'. Each dummy electrode 106 is similarly connected through a switch diode 120 to a common conductor 122 connected to the opposite intermediate corner D of the bridge. High-frequency voltage is applied to the bridge input junction A through a coupling condenser 124 as shown. To this same junction back-bias voltage rendering all of the diodes normally nonconductive is applied through resistance 126 from a point 128 of constant potential in the voltage-regulated supply 130 as shown. This same regulated supply includes a point 132 of higher potential which, when applied to the cathode of any switching diode will render such diode conductive and thereby connect its associated electrode strip to the appropriate junction of the bridge circuit 20', as in the previous embodiment.

In order to achieve this switching function the circuit shown in FIGURE 3 incorporates a control transistor 134 for each diode pair 116, 120, having its emitter connected to ground conductor 136 and its collector connected through a bias resistance 138 to the conductor 140, to which the potential of voltage source junction 132 is applied. The collector of transistor 134 in turn is connected to the cathodes of the respective diodes 116 and 120 of each active-dummy electrode pair through the respective resistances 142 and 144. Although not shown, the system may include marker or indicator units associated with each pair of active and dummy electrodes and arranged to be operated at the same time the switching diodes of that pair are rendered conductive, this being represented in the diagram by the conductors 146 extending from the driven or base electrodes of transistors 134.

In order to connect the paired active and dummy electrodes momentarily into the bridge circuit in sequential manner, the system shown in FIGURE 3 also incorporates an electronic counter circuit comprising a succession of trigger circuits 150A, 150B, etc., having respective output conductors 152 connected to the associated drive transistors 134 which apply forward-bias to the electrode switch diodes as described.

Trigger circuit stages 150A, 150B, etc., there being one such circuit for each active-dummy electrode pair, are arranged as a ring counter. Each such stage provides a carry-over to the next succeeding stage so as to trigger that stage, and the last stage in the series is connected to provide carry-over to the first stage for recycling purposes. Only one stage is active at a time to provide forward bias to the associated switching diodes, 116, 120, through the drive amplifier 134. A trigger pulse applied to input terminal 160 is necessary in order to switch the one active stage to the inactive state. In so doing the next stage is switched from the inactive to the active state automatically. Thus, with the application of a succession of trigger pulses to terminal 160 the electrode pairs are connected sequentially to bridge circuit 20' in order to scan recurringly successive areas across the width of sheet material S for moisture content.

The applied trigger impulses at terminal 160 are sharpened and shortened by passing them through a differentiating condenser 162 and resistor 164 for application to the input conductor 166 common to the emitter-base circuits of control transistors 168 in the respective trigger circuits. Except in one stage, all transistors 168 are biased "off" while their companion transistors 170 are biased "on" as a result of positive bias provided to their base electrodes from the collectors of transistors 168 through the R-C cross coupling connections 172. Since the collectors of transistors 170 are all at or near zero potential (except in the one stage), all of the transistors 134 are biased "off." The bases of transistors 168 are normally biased slightly negative as a result of the R-C couplings 174 from the collectors of transistors 170, and the connections from such bases through respective resistances 176 to a point 178 of negative potential. The emitters of transistors 170 are connected directly to ground through conductor 180, whereas the collectors of transistors 168 are connected to a source 182 of positive potential through resistances 184, and the collectors of transistors 170 are connected to the same positive potential through resistances 186. Thus, a positive trigger pulse applied between the base and emitter of that transistor 168 which is in the "on" condition will render its collector-base circuit nonconductive, and the attendant drop of collector voltage of the associated transistor 170 will be carried over to the next succeeding stage through the coupling condenser 188, causing its transistor 170 to be triggered "off" and thereby apply driving current to the output amplifier 134. However, the triggering action stops with this stage, inasmuch as the stage which follows it is not triggered by the positive pulse which it receives through coupling condenser 24 from the preceding stage which has just been turned "on."

Such triggered ring counter circuits are well known, so that the above abbreviated operating description thereof should suffice for purposes of describing the nature and function of the illustrative ring counter switching system for sequentially connecting the electrode pairs to the common bridge circuit components 20'. Any suitable source of trigger impulses may be utilized, of which there are many available types, and if desired that source may be made adjustable as to trigger pulse frequency so as to control the switching rate applied to the electrodes. Alternatively, counter circuits may be used which are not of the ring or closed-loop type, as may circuits be used which run through a complete cycle on application of a single trigger pulse to the first stage. Again, as a further alternative, self-operating and recycling ring counters may be used without necessity for external triggering, although in that event it will be desirable to monitor the trigger circuit operation so as to maintain the switching rate at a desired value. These and other variations in the use of counter-type trigger circuits for sequential switching control of the switching diodes will be recognized by those skilled in the art.

In order further to minimize circuit decalibration due to thermal drift, those portions of the composite detection bridge which comprise and are individual to the associated dummy and active electrodes are housed proximate to the electrodes and within the electrode box 50 as a common thermal environment. This may be done conveniently as shown by forming and/or mounting these components and their connections as parts of hybrid printed circuits. Thus, for each electrode pair there is a circuit board 190 mounted centrally within the housing 50 at right angles to the longitudinal axis thereof at the location of the associated electrodes. Resistor 142 and associated diode 116 are mounted on circuit board 190 on one side of the vertical midplane of housing 50, whereas resistor 144 and diode 120 are similarly mounted on the board in symmetrical relationship to the elements 142 and 116. In order to correct for slight structural differences due to manufacturing tolerances, an adjustable capacitance 192 is mounted on the circuit board, connected between the adjacent side wall of the housing 50 and to one of the associated active and dummy electrodes, preferably the active electrode because the dummy tends to have a slightly higher capacity than the active electrode due to the fact that the dummy electrode faces into the interior of the box 50. The circuit boards 190 are suspended by their connecting wires from the active and dummy electrodes, with additional support received from insulating posts 194 at the bottom of the housing. Preferably, the common conductors 118 and 122 which connect the individual switching diodes 116 and 120 to the common portion of the bridge circuit, 20' (mounted exteriorly of the housing 50) comprise stainless steel wires of the same thermal expansion characteristic as the housing walls. These wires extend lengthwise of the elongated housing and link together all of the connecting boards. These wires 118 and 122 are located close to each other and symmetrically with relation to the longitudinal midplane of the housing so as to preserve the electrical balance of the bridge system.

However, despite these precautions there may still be some thermal drift of the circuit assembly. This may be corrected by use of a capacitance 196 of the type having a negative temperature coefficient and which is connected between ground and either of the common conductors 118 or 122. The unbalance introduced by this negative coefficient capacitor may be offset at a selected reference temperature by another capacitor 198 connected between ground and the other of conductors 118 and 122. Capacitors 198 and 196 are arranged symmetrically about the housing midplane. Capacitor 198 is of the type having substantially zero thermal drift but has approximately the same capacity as that of condenser 196 at the selected reference temperature.

In order to connect the electrode assembly and the associated circuit components housed in the box 50 to the external circuit apparatus, it is only necessary to employ two cables connected respectively to the common conductors 118 and 122, together with the necessary number of conductors 200 (one for each trigger circuit stage) for operating the switching diodes. These external conductors should be insulated and appropriately shielded and should be as short as possible, particularly those connected to conductors 118 and 122 since the latter carry high-frequency currents and interconnect relatively high-impedance elements (i.e. the electrodes and the opposing bridge circuit arms). The coaxial cables which connect the bridge circuit to the R-F conductors 118 and 122 are preferably taped together or otherwise arranged so as to be subject to the same thermal effects, and in the event of bending to be bent in the same manner so as to produce balanced deviations which do not impair the balance of the highly sensitive bridge circuit.

With the improved moisture detection system it will be seen that selected localized areas of sheet material may be scanned systematically as rapidly as necessary to accommodate even the highest production line speeds and so as to accommodate even the widest sheets likely to be encountered. Moreover, the local area measurements, though derived through a highly sensitive circuit, are uniformly and stably related to a common calibrational reference and are virtuallly independent of ambient temperature fluctuations. The compactly organized electrode array assembly and associated circuit components commonly housed therewith permit incorporation of the system in most sheet material production facilities with little or no alteration thereof and without necessity for special environmental protection. The system lends itself to coordinated local area measurement and related marking of the sheet material or to other and alternative usages of the measurements derived.

We claim as our invention:

1. Materials testing apparatus comprising a plurality of primary active electrodes and a support on which they are mounted at interval locations in a series array adapted for positioning in proximate confrontal relationship to the test material, secondary active electrode means mounted on the support in electrically opposed relationship to said primary electrodes, and together therewith being operable when energized to set up localized electric fields traversing a series of regions in the test material, a plurality of primary dummy electrodes and secondary dummy electrode means respectively similar to said active electrodes and electrode means and positioned parallel thereto beneath the primary active electrodes and secondary electrode means, respectively, in substantially the same thermal environment therewith, bridge circuit means having branches adapted to be connected respectively to the active electrodes and corresponding dummy electrodes and operable by energization of such electrodes to detect moisture content in the material, and means operable to switch corresponding active and dummy electrodes into their respective branches sequentially, whereby temperature-induced changes in the electrical characteristics of said primary active electrodes and electrode means are matched and compensated by substantially equal changes in the like characteristics of said primary and secondary dummy electrodes and electrode means.

2. The apparatus defined in claim 1, wherein the primary active electrodes and secondary active electrode means comprise thin conductive strips mounted on one face of a dielectric supporting plate and the similar primary dummy electrodes and secondary dummy electrode means are mounted on the opposite face of the plate.

3. The apparatus defined in claim 2, and thermally insulative dielectric cover sheets sandwiching between them the active and dummy primary electrodes and secondary electrode means together with said plate in a composite laminar assembly, said cover sheets being more resistive than said plate to heat flow through them.

4. Materials testing electrode means comprising a plurality of primary active electrodes and a support on which they are mounted at interval locations in a series array adapted for positioning in proximate confrontal relationship to the test material, secondary active electrode means mounted on the support in electrically opposed relationship to said primary electrodes, and together therewith being operable when energized to set up localized electric fields traversing a series of regions in the test material, a plurality of primary dummy electrodes and secondary dummy electrode means respectively similar to said active electrodes and electrode means and positioned parallel thereto beneath the primary active electrodes and secondary electrode means, respectively, in substantially the same thermal environment therewith, said primary active electrodes and secondary active electrode means comprising thin conductive strips mounted on one face of a dielectric supporting plate and the similar primary dummy electrodes and secondary dummy electrode means being mounted on the opposite face of the plate.

5. The apparatus defined in claim 4, and wherein the conductive strips and plate comprise an integrally bonded circuit board, and wherein the thermal environment thereof comprises thermally insulative dielectric cover sheets sandwiching the circuit board between them, said cover sheet being more resistive than said plate to heat flow through them.

6. The assembly defined in claim 4, further including an elongated electrically conductive box-like enclosure having an open side, said active and dummy electrodes being mounted in the opening spaced inwardly from the edges of the opening, a measurement bridge circuit having opposite branches, a plurality of switching circuit means mounted within the enclosure, including bias-controlled switching diodes arranged for connecting corresponding active and dummy electrodes simultaneously into the bridge circuit branches, and means for electrically biasing the diodes for conduction sequentially.

7. The assembly defined in claim 4, further including a bridge circuit, a plurality of bias-controlled switching diodes interposed electrically between the respective active electrodes and one side of the bridge circuit, corresponding bias-controlled switching diodes interposed electrically between the respective dummy electrodes and the opposite side of the bridge circuit, and means operable to render said diodes conductive in sequential order whereby to connect corresponding active and dummy electrodes into opposite sides of the bridge circuit sequentially.

8. Material scanning type moisture detection apparatus comprising an array of similar test electrodes arranged in electrical relationship with the test material, a measurement circuit common to said electrodes, and means for connecting the individual electrodes successively to the measurement circuit, including bias-controlled solid-state switches individual to the respective electrodes, means normally back-biasing said switches against conductivity, and means for momentarily forward-biasing said switches in sequence to render the same conductive and thereby connect said electrodes to said circuit sequentially to scan the test material, said apparatus further including with each test electrode a similar dummy electrode, means disposing each dummy electrode in substantially the same thermal environment as the corresponding test electrode but out of electrical relationship with the test material, bias-controlled solid-state switches individual to the respective dummy electrodes, means normally back-biasing said latter switches against conductivity, and means momentarily forward-biasing said latter switches in sequence to render the same conductive simultaneously with the corresponding test electrode switches so as to connect each test electrode and its corresponding dummy electrode in the measurement circuit simultaneously, said circuit having mutually balanced sections wherein the electrical admittance of each dummy electrode is balanced against that of the corresponding test electrode whereby to eliminate the effect of temperature change in the test electrode admittance.

References Cited

UNITED STATES PATENTS

| | | | |
|---|---|---|---|
| 2,963,908 | 12/1960 | Shawhan | 324—61 XR |
| 3,043,993 | 7/1962 | Maltby | 324—61 XR |

FOREIGN PATENTS

| | | |
|---|---|---|
| 673,684 | 11/1963 | Canada. |
| 991,590 | 10/1951 | France. |

RUDOLPH V. ROLINEC, *Primary Examiner.*

E. E. KUBASIEWICZ, *Assistant Examiner.*

U.S. Cl. X.R.

317—246